(12) United States Patent
Tsai et al.

(10) Patent No.: US 11,543,902 B2
(45) Date of Patent: Jan. 3, 2023

(54) TOUCH PANEL AND TOUCH DEVICE

(71) Applicant: TPK Advanced Solutions Inc., Fujian (CN)

(72) Inventors: Li-Huang Tsai, Zhunan Township, Miaoli County (TW); Zi-Jun Ding, Xiamen (CN); Yun-Guo Xu, Fuzhou (CN); Jian-Hua Fang, Putian (TW); Li-De Lv, Xiamen (CN)

(73) Assignee: TPK Advanced Solutions Inc., Fujian (CN)

( * ) Notice: Subject to any disclaimer, the term of this patent is extended or adjusted under 35 U.S.C. 154(b) by 34 days.

(21) Appl. No.: 17/105,686

(22) Filed: Nov. 27, 2020

(65) Prior Publication Data

US 2022/0171476 A1    Jun. 2, 2022

(51) Int. Cl.
*G06F 3/041* (2006.01)
(52) U.S. Cl.
CPC .................................... *G06F 3/041* (2013.01)
(58) Field of Classification Search
CPC ................. G06F 3/041; G06F 3/04164; G06F 2203/04103; G06F 2203/04112
See application file for complete search history.

(56) References Cited

U.S. PATENT DOCUMENTS

| | | | |
|---|---|---|---|
| 6,433,841 B1 * | 8/2002 | Murade | G02F 1/13454 349/110 |
| 10,698,552 B2 | 6/2020 | Wang et al. | |
| 2014/0118634 A1 * | 5/2014 | Kang | G06F 3/0443 349/12 |
| 2014/0375909 A1 | 12/2014 | Misaki | |
| 2015/0070312 A1 * | 3/2015 | Her | G06F 3/0446 345/174 |
| 2015/0223324 A1 * | 8/2015 | Kim | G06F 3/0443 345/174 |
| 2016/0195987 A1 * | 7/2016 | Lin | G06F 3/0445 345/173 |
| 2016/0357294 A1 * | 12/2016 | Ozeki | C03C 15/00 |
| 2017/0147104 A1 * | 5/2017 | Imazeki | G06F 3/0412 |

FOREIGN PATENT DOCUMENTS

| | | | |
|---|---|---|---|
| CN | 106155403 A | 11/2016 | |
| CN | 107068720 A * | 8/2017 | ........... G06F 3/0412 |
| CN | 108897449 A | 11/2018 | |
| CN | 108984027 A | 12/2018 | |
| CN | 111095175 A | 5/2020 | |
| KR | 20200113174 A | 10/2020 | |
| TW | 201318009 A1 | 5/2013 | |
| WO | 2019142582 A1 | 7/2019 | |

* cited by examiner

*Primary Examiner* — Temesghen Ghebretinsae
*Assistant Examiner* — Sosina Abebe
(74) *Attorney, Agent, or Firm* — Cooper Legal Group, LLC (57) ABSTRACT

A touch panel includes a substrate, a peripheral circuit layer, and a touch sensing electrode layer. The substrate has a visible region and a border region surrounding the visible region. The peripheral circuit layer is disposed on the substrate and located in the border region, and has at least one concave portion, in which the concave portion is located on a surface of the peripheral circuit layer facing away from the substrate. The touch sensing electrode layer is disposed in the visible region and partially extends to the border region to at least cover the concave portion, in which the touch sensing electrode layer has at least one entering portion extending into the concave portion.

20 Claims, 4 Drawing Sheets

TOUCH PANEL AND TOUCH DEVICE

BACKGROUND

Field of Disclosure

The present disclosure relates to a touch panel and a touch device, and particularly relates to a touch panel and a touch device having an overlapping structure.

Description of Related Art

In recent years, touch panels have been widely used in portable electronic products such as mobile phones, notebook computers, satellite navigation systems, and digital audio-visual players to serve as information communication channels between users and electronic devices.

A touch panel includes touch electrodes and peripheral circuits, and the touch electrodes and the peripheral circuits are usually in contact with each other in the peripheral area to form a conductive path or loop, in which the contact impedance will affect the signal transmission and the response rate of the touch panel. The contact impedance depends on an overlapping area between the touch electrodes and the peripheral circuits. Generally, the contact impedance becomes lower when the overlapping area becomes larger. However, the overlapping area will directly affect the size of the peripheral area of the touch panel, and as demands for narrow bezel products gradually increase, a touch panel which can not only meet the size requirements of the peripheral area, but also meet the requirements of the contact impedance is currently worth studying.

SUMMARY

According to some embodiments of the present disclosure, a touch panel includes a substrate, a peripheral circuit layer, and a touch sensing electrode layer. The substrate has a visible region and a border region surrounding the visible region. The peripheral circuit layer is disposed on the substrate and located in the border region, and has at least one concave portion, in which the concave portion is located on a surface of the peripheral circuit layer facing away from the substrate. The touch sensing electrode layer is disposed in the visible region and partially extends to the border region to at least cover the concave portion, in which the touch sensing electrode layer has at least one entering portion extending into the concave portion.

In some embodiments, a vertical depth of the concave portion is smaller than a vertical thickness of the peripheral circuit layer.

In some embodiments, the concave portion includes a bottom surface and a sidewall adjacently connected to the bottom surface and enclosing an accommodating space.

In some embodiments, the entering portion is accommodated in the accommodating space and contacts the bottom surface and the sidewall.

In some embodiments, a vertical depth of the concave portion is equal to a vertical thickness of the peripheral circuit layer.

In some embodiments, the concave portion includes a sidewall enclosing an accommodating space, and the sidewall is adjacently connected to a surface of the substrate facing toward the peripheral circuit layer.

In some embodiments, the entering portion is accommodated in the accommodating space and contacts the surface of the substrate facing toward the peripheral circuit layer and the sidewall.

In some embodiments, the touch sensing electrode layer includes a matrix and a plurality of metal nanostructures distributed in the matrix.

In some embodiments, a density of the metal nanostructures in the matrix is between 10% and 50%.

In some embodiments, the peripheral circuit layer includes a metal material, and a reactivity of the metal material is higher than a reactivity of the metal nanostructures.

In some embodiments, the touch sensing electrode layer is in contact with a sidewall of the peripheral circuit layer.

According to some other embodiments of the present disclosure, a touch device includes the aforementioned touch panel.

In some embodiments of the present disclosure, the touch device includes a display, a portable phone, a notebook, a tablet, a wearable device, a wearable device, a car device, or a polarizer.

According to the aforementioned embodiments of the present disclosure, the touch panel includes a peripheral circuit layer having a concave portion and a touch sensing electrode layer having an entering portion. Since the touch sensing electrode layer extends to cover a portion of the peripheral circuit layer such that the entering portion extends into the concave portion (the entering portion can also be regarded as a convex portion) and the shape of the entering portion and the shape of the concave portion are complementary and matched with each other, the overlapping area of the peripheral circuit layer and the touch sensing electrode layer can be increased, thereby improving the electrical overlapping stability between the peripheral circuit layer and the touch sensing electrode layer. In addition, through the combination of materials between the peripheral circuit layer and the touch sensing electrode layer, the electrical overlapping stability between the peripheral circuit layer and the touch sensing electrode layer can also be improved. As a result, a lateral width of the border region of the touch panel can be reduced to meet the needs of users for narrow bezel products.

BRIEF DESCRIPTION OF THE DRAWINGS

The disclosure can be more fully understood by reading the following detailed description of the embodiments, with reference made to the accompanying drawings as follows.

DETAILED DESCRIPTION

Reference will now be made in detail to the present embodiments of the disclosure, examples of which are illustrated in the accompanying drawings. Wherever possible, the same reference numbers are used in the drawings and the description to refer to the same or like parts.

In addition, relative terms such as "lower" or "bottom" and "upper" or "top" can be used herein to describe the relationship between one element and another element, as shown in the figure. It should be understood that relative terms are intended to include different orientations of the device other than those shown in the figures. For example, if the device in one figure is turned over, elements described as being on the "lower" side of other elements will be oriented on the "upper" side of the other elements. Therefore, the exemplary term "lower" may include an orientation of "lower" and "upper", depending on the specific orientation of the drawing. Similarly, if the device in one figure is turned over, elements described as "below" other elements will be oriented "above" the other elements. Therefore, the exemplary term "below" can include an orientation of "above" and "below".

The present disclosure provides a touch panel, in which a peripheral circuit layer of the touch panel has a concave portion, and a touch sensing electrode layer of the touch panel has an entering portion. Since the touch sensing electrode layer extends and covers a portion of the peripheral circuit layer such that the entering portion extends into the concave portion and the shape of the entering portion and the shape of the concave portion are complementary and matched with each other, the overlapping area of the peripheral circuit layer and the touch sensing electrode layer can be increased, thereby improving the electrical overlapping stability between the peripheral circuit layer and the touch sensing electrode layer. As a result, a lateral width of a border region of the touch panel can be reduced to meet the needs of users for narrow bezel products.

Figure 1:
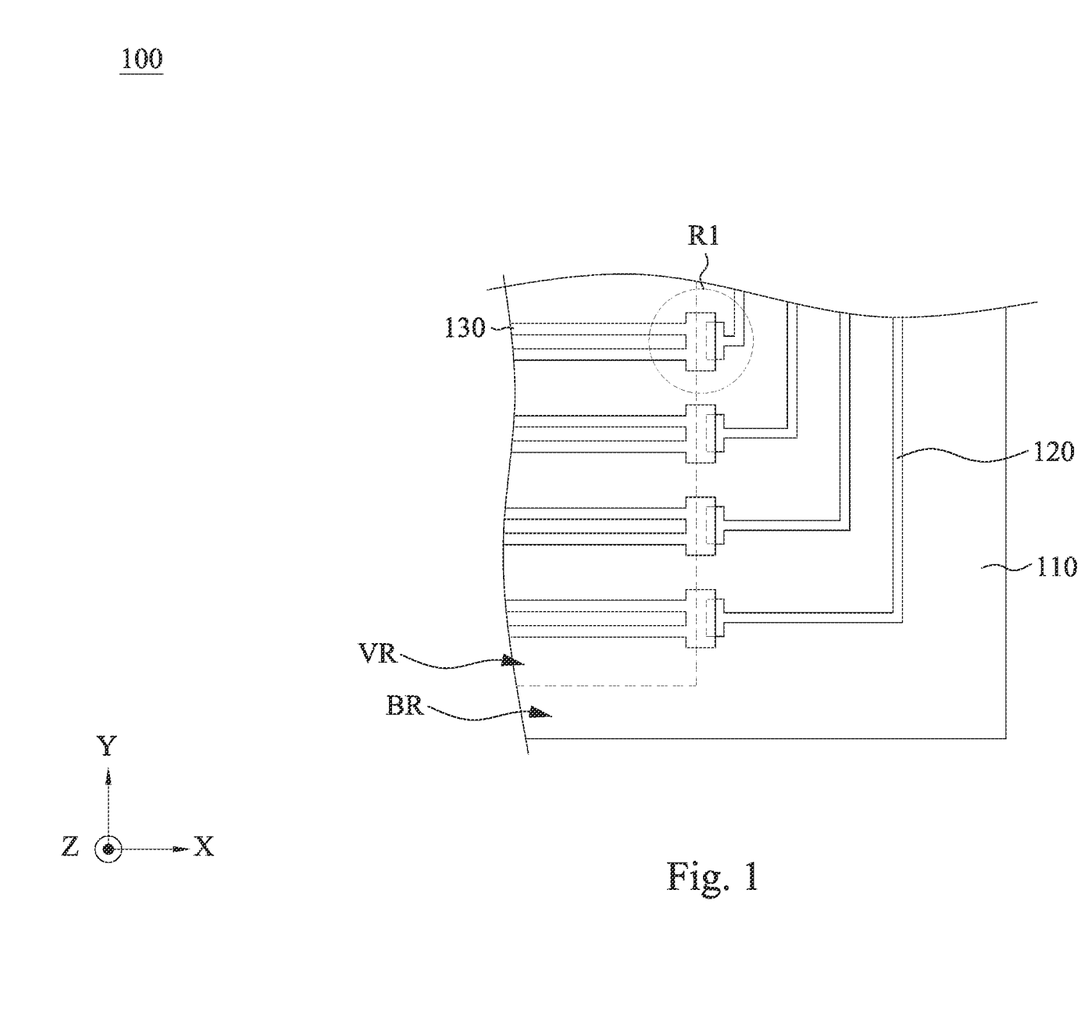
FIG. 1 is a schematic top view illustrating a touch panel according to some embodiments of the present disclosure.
Figure 2:
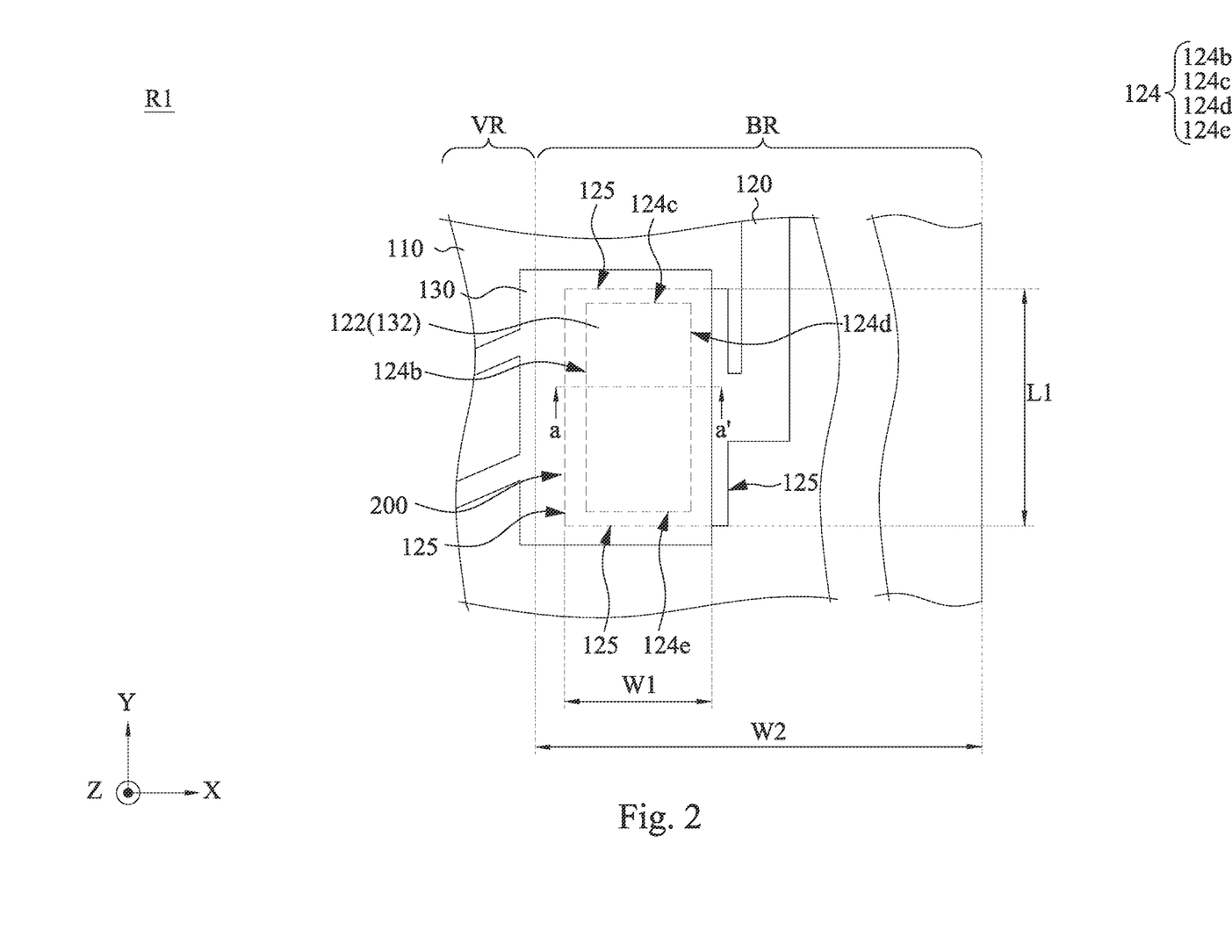
FIG. 2 is a schematic partial enlargement view illustrating the region R1 of the touch panel in FIG. 1.

FIG. 1 is a schematic top view illustrating a touch panel 100 according to some embodiments of the present disclosure. FIG. 2 is a schematic partial enlargement view illustrating the region R1 of the touch panel 100 in FIG. 1. Reference is made to FIG. 1 and FIG. 2. The touch panel 100 includes a substrate 110, a peripheral circuit layer 120, and a touch sensing electrode layer 130. The substrate 110 extends along a horizontal plane (e.g., a plane formed by the X axis and the Y axis) and has a visible region VR and a border region BR surrounding the visible region VR. Although the touch sensing electrode layer 130 in this embodiment is illustrated to include X-axis electrodes, the touch sensing electrode layer 130 may also include Y-axis electrodes in actual designs. In addition, the electrode pattern of the touch sensing electrode layer 130 is not limited to the present disclosure.

In some embodiments, the substrate 110 may be, for example, a rigid transparent substrate or a flexible transparent substrate. In some embodiments, a material of the substrate 110 includes, but is not limited to, transparent materials such as glass, acrylic, polyvinyl chloride, polypropylene, polystyrene, polycarbonate, cycloolefin polymer, cycloolefin copolymer, polyethylene terephthalate, polyethylene naphthalate, colorless polyimide, or combinations thereof. In some embodiments, pre-treatment steps may be performed on the surface of the substrate 110. For example, a surface modification process is performed or an adhesive layer or a resin layer is additionally coated on the surface of the substrate 110 to enhance the adhesion between the substrate 110 and other layers (e.g., the peripheral circuit layer 120 and the touch sensing electrode layer 130 over the substrate 110).

The peripheral circuit layer 120 is disposed on the substrate 110 and located in the border region BR. The touch sensing electrode layer 130 is disposed on the substrate 110 and located in the visible region VR, and partially extends to the border region BR so as to cover a portion of the peripheral circuit layer 120. In some embodiments, the peripheral circuit layer 120 and the touch sensing electrode layer 130 are sequentially stacked on the substrate 110 to form an overlapping structure 200 located in the border region BR.

In some embodiments, the touch sensing electrode layer 130 overlaps the peripheral circuit layer 120 to define an overlapping region, and the overlapping region has an overlapping area. In this embodiment, the overlapping region is a quadrilateral region in a top view (i.e., the viewing angle of FIG. 2). More specifically, the overlapping region in this embodiment is a quadrilateral region formed by a length L1 and a width W1 in a top view.

When the touch panel 100 is in operation, the touch sensing electrode layer 130 located in the visible region VR can sense touch motion of a user to generate a touch sensing signal, and the touch sensing signal can further be transmitted to the peripheral circuit layer 120 located in the border region BR for subsequent signal processing through the overlapping contact between the touch sensing electrode layer 130 and the peripheral circuit layer 120 in the overlapping structure 200. In the following descriptions, the overlapping structure 200 of the present disclosure will be described in more detail.

Figure 3A:
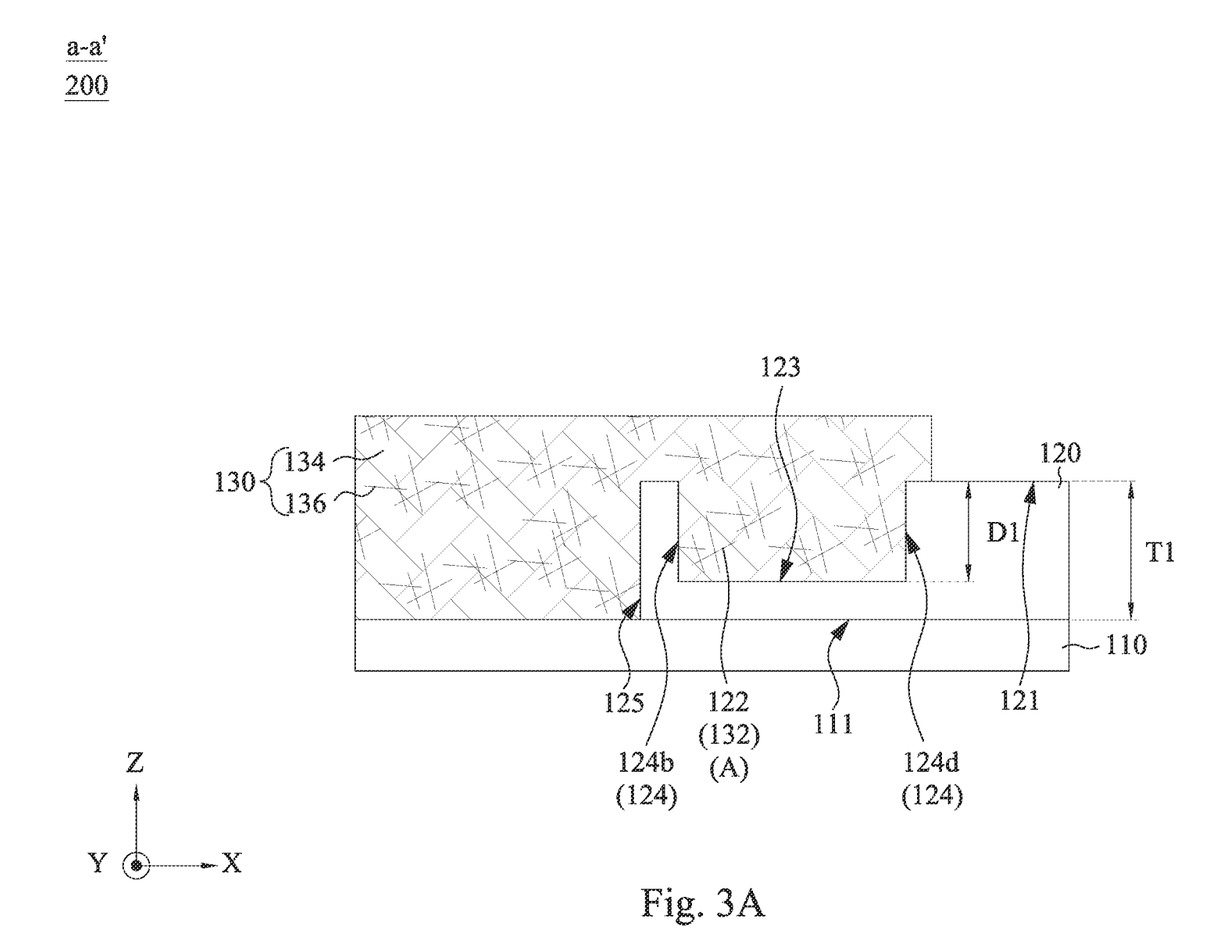
FIG. 3A is a schematic cross-sectional view illustrating the touch panel in FIG. 2 taken along line a-a' according to some embodiments of the present disclosure.

FIG. 3A is a schematic cross-sectional view illustrating the touch panel 100 in FIG. 2 taken along line a-a' according to some embodiments of the present disclosure. It should be understood that the cross-section taken along line a-a' in FIG. 3A is the cross-section of the overlapping structure 200 according to some embodiments of the present disclosure. That is, FIG. 3A is a schematic cross-sectional view illustrating the overlapping structure 200 of the touch panel 100 in FIG. 2 according to some embodiments of the present disclosure. Reference is made to FIG. 2 and FIG. 3A. The overlapping structure 200 is located in the border region BR of the substrate 110 and includes the peripheral circuit layer 120 and the touch sensing electrode layer 130. The peripheral circuit layer 120 is disposed on the substrate 110 and contacts the substrate 110. The touch sensing electrode layer 130 is disposed on the substrate 110, covers and contacts a portion of the peripheral circuit layer 120, and is electrically connected to the peripheral circuit layer 120.

In some embodiments, the peripheral circuit layer 120 may have at least one concave portion 122, and the concave portion 122 is located on a surface 121 of the peripheral circuit layer 120 facing away from the substrate 110. In some embodiments, the concave portion 122 is completely located in the peripheral circuit layer 120 along a projecting direction (Z-axis direction) perpendicular to the substrate 110 without affecting an edge of the peripheral circuit layer 120. More specifically, the peripheral circuit layer 120 has a sidewall 125 forming the edge of the peripheral circuit layer 120, and the concave portion 122 includes a bottom surface 123 and a sidewall 124 adjacently connected to the bottom surface 123 and enclosing an accommodating space A. The sidewall 124 of the concave portion 122 and the sidewall 125 of the peripheral circuit layer 120 constitute a thickness. That is, the sidewall 124 of the concave portion 122 and the sidewall 125 of the peripheral circuit layer 120 are spaced apart from each other. In some embodiments, in terms of a rectangular concave portion 122, the sidewall 124 of the concave portion 122 may include a first sidewall 124b, a second sidewall 124d, a third sidewall 124c, and a fourth sidewall 124e. The first sidewall 124b and the second sidewall 124d are opposite to each other, and the third sidewall 124c and the fourth sidewall 124e are adjacent to the first sidewall 124b and the second sidewall 124d and are opposite to each other.

In some embodiments, the touch sensing electrode layer 130 may have at least one entering portion 132, and since the touch sensing electrode layer 130 partially covers the peripheral circuit layer 120, the entering portion 132 can extend into the concave portion 122 of the peripheral circuit layer 120. The shape of the entering portion 132 and the shape of the concave portion 122 are complementary and matched with each other, such that the electrical overlap between the touch sensing electrode layer 130 and the peripheral circuit layer 120 is stable. Thus a lateral width W2 of the border region BR of the touch panel 100 can be reduced. In other words, the sidewall 124 of the concave portion 122 fully surrounds the entering portion 132 and tightly contacts the entering portion 132. Since the shape of the entering portion 132 and the shape of the concave portion 122 are complementary and matched with each other, the shape and the number of the entering portion 132 may depend on the shape and the number of the concave portion 122. That is, the shape and the number of the entering portion 132 may be substantially identical to the shape and the number of the concave portion 122. In addition, the touch sensing electrode layer 130 may further be in contact with the sidewall 125 of the peripheral circuit layer 120 to better improve the overlapping quality between the peripheral circuit layer 120 and the touch sensing electrode layer 130.

In some embodiments, the shape of the concave portion 122 in a top view in the Z-axis direction (i.e., the viewing angle of FIG. 2) may be a rectangle, so as to provide convenience in the manufacturing process of the touch panel 100. In some other embodiments, the shape of the concave portion 122 in a top view may be, for example, a circle, an ellipse, a triangle, a polygon, other suitable shapes, or combinations thereof. In some embodiments, a depth D1 of the concave portion 122 along the Z-axis (also referred to as a vertical depth D1) may be smaller than a thickness T1 of the peripheral circuit layer 120 along the Z-axis (also referred to as a vertical thickness T1). More specifically, the entering portion 132 is accommodated in the accommodating space A and contacts the bottom surface 123 and the sidewall 124 of the concave portion 122. Accordingly, when the shape of the concave portion 122 is a rectangle, the number of the contact surface between the touch sensing electrode layer 130 and the peripheral circuit layer 120 will increase from the original one overlapping contact plane to at least five overlapping contact surfaces, in which the five overlapping contact surfaces include the bottom surface 123 and the sidewall 124 (e.g., including the first sidewall 124b, the second sidewall 124d, the third sidewall 124c, and the fourth sidewall 124e) which constitutes the concave portion 122. As such, the overlapping area between the touch sensing electrode layer 130 and the peripheral circuit layer 120 can be increased. In some embodiments, the number of the concave portion 122 may be, for example, one, to provide convenience in the manufacturing process of the touch panel 100. In some other embodiments, the number of the concave portion 122 may be, for example, two or more, and the concave portions 122 may have different shapes in top view and different vertical depths D1. When the number of the concave portion 122 is multiple, the overlapping area between the peripheral circuit layer 120 and the touch sensing electrode layer 130 can further be increased, thereby improving the electrical overlapping stability between the peripheral circuit layer 120 and the touch sensing electrode layer 130.

In some embodiments, the touch sensing electrode layer 130 may include a matrix 134 and a plurality of metal nanowires (also referred to as metal nanostructures) 136 distributed in the matrix 134. In some embodiments, the matrix 134 may include polymers or a mixture thereof, thereby giving specific chemical, mechanical, and optical properties to the touch sensing electrode layer 130. For example, the matrix 134 can provide good adhesion between the touch sensing electrode layer 130 and the peripheral circuit layer 120 and between the touch sensing electrode layer 130 and the substrate 110. As another example, the matrix 134 can provide the touch sensing electrode layer 130 with good mechanical strength. In some embodiments, the matrix 134 includes a specific polymer, such that the touch sensing electrode layer 130 has additional surface protection against scratches and abrasion, thereby enhancing the surface strength of the touch sensing electrode layer 130. The above specific polymer may be, for example, polyacrylate, epoxy resin, polyurethane, poly (silicon-acrylic acid), polysiloxane, polysilane, or combinations thereof. In some embodiments, the matrix 134 may further include crosslinking agents, polymerization inhibitors, stabilizers (e.g., including but not limited to antioxidants or ultraviolet light stabilizers), surfactants, or combinations thereof, thereby improving the anti-ultraviolet property of the touch sensing electrode layer 130 and prolonging the service life of the touch sensing electrode layer 130.

The metal nanowires 136 may include, but are not limited to, silver nanowires, gold nanowires, copper nanowires, nickel nanowires, or combinations thereof. More specifically, the term "metal nanowires 136" used herein is a collective noun, which refers to a collection of metal wires that include multiple metal elements, metal alloys, or metal compounds (including metal oxides). In some embodiments, a cross-sectional size (e.g., a diameter of the cross-section) of a single metal nanowire may be less than 500 nm, preferably less than 100 nm, and more preferably less than 50 nm. In some embodiments, a single metal nanowire 136 has a large aspect ratio (i.e., length:diameter of the cross-section). Specifically, the aspect ratio of a single metal nanowire may be between 10 and 100,000. In more detail, the aspect ratio of a single metal nanowire may be greater than 10, preferably greater than 50, and more preferably greater than 100. Moreover, other terms such as silk, fiber, or tube also have the aforementioned cross-sectional dimensions and aspect ratios, which also fall within the scope of the present disclosure.

In some embodiments, the electrical overlapping stability between the peripheral circuit layer 120 and the touch sensing electrode layer 130 may further depend on the chemical characteristics (e.g., the material) of the peripheral circuit layer 120. In other words, by adjusting the chemical characteristics of the peripheral circuit layer 120, the electrical overlapping stability between the peripheral circuit layer 120 and the touch sensing electrode layer 130 can be further improved. Specifically, a metal material having a higher reactivity (or chemical reactivity) than a reactivity of the metal nanowires 136 can be selected to form the peripheral circuit layer 120, such that the metal nanowires 136 can gather in the touch sensing electrode layer 130 adjacent the peripheral circuit layer 120 (i.e., a portion of the touch sensing electrode layer 130 overlapping the peripheral circuit layer 120) more easily. Accordingly, a density of the metal nanowires 136 in the touch sensing electrode layer 130 of the overlapping structure 200 is increased to improve the electrical overlapping stability between the peripheral circuit layer 120 and the touch sensing electrode layer 130. For example, when silver nanowires are selected as being the metal nanowires 136, a metal having a higher reactivity than a reactivity of silver (e.g., copper) can be selected as the material of the peripheral circuit layer 120. In some other embodiments, the peripheral circuit layer 120 may include silver, copper-silver alloy, or other suitable conductive materials.

Since the metal nanowires 136 in the touch sensing electrode layer 130 are subjected to the chemical characteristics of the peripheral circuit layer 120 to settle and gather in the touch sensing electrode layer 130 adjacent the peripheral circuit layer 120, a density of the metal nanowires 136 in the matrix 134 in the touch sensing electrode layer 130 of the overlapping structure 200 may be between 10% and 50%. As such, the touch sensing electrode layer 130 can be ensured to have good conductivity, such that the peripheral circuit layer 120 and the touch sensing electrode layer 130 have good electrical overlapping stability. In detail, the aforementioned density will affect the surface resistance of the touch sensing electrode layer 130 and the overall optical appearance of the touch panel 100. If the density is too low, that is, the metal nanowires 136 are sparsely distributed in the matrix 134, excessive surface resistance may result; if the density is too high, that is, the metal nanowires 136 are densely distributed in the matrix 134, the light transmittance may be reduced and affect the optical property. It should be understood that the aforementioned optical property refers to the optical property of the visible region VR, and since the touch sensing electrode layer 130 located in the visible region VR and the touch sensing electrode layer 130 extending into the border region BR are formed as a whole on the entire surface by coating during the manufacturing process of the touch panel 100, the density of the metal nanowires 136 in the touch sensing electrode layer 130 located in the border region BR is substantially similar to the density of the metal nanowires 136 in the touch sensing electrode layer 130 located in the visible area VR. Therefore, under the aforementioned design of coating the touch sensing electrode layer 130 as a whole on the entire surface, when considering the density of the metal nanowires 136 in the touch sensing electrode layer 130 located in the border region BR, it is also necessary to consider the optical property of the visible region VR of the touch panel 100. It should be understood that the term "density" herein refers to the number of metal nanowires 136 included in the touch sensing electrode layer 130 per unit area.

In more detail, the touch sensing electrode layer 130 can be formed through the steps of coating, curing, and drying of a dispersion including the metal nanowires 136. In some embodiments, the dispersion includes a solvent, such that the metal nanowires 136 are uniformly dispersed in the solvent. Specifically, the solvent is, for example, water, alcohols, ketones, ethers, hydrocarbons, aromatic solvents (benzene, toluene, xylene, etc.), or combinations thereof. In some embodiments, the dispersion may further include additives, surfactants, and/or binding agents to improve the compatibility between the metal nanowires 136 and the solvent and the stability of the metal nanowires 136 in the solvent. Specifically, the additives, surfactants, and/or binding agents may be, for example, carboxymethyl cellulose, hydroxyethyl cellulose, hypromellose, fluorosurfactant, sulfosuccinate sulfonate, sulfate, phosphate, disulfonate, or combinations thereof.

Firstly, the coating step may include, but is not limited to, screen printing, nozzle coating, or roller coating. In some embodiments, a roll-to-roll process may be performed to uniformly coat the dispersion including the metal nanowires 136 on the top surface 111 of the substrate 110 and the top surface 121 of the peripheral circuit layer 120. Since the peripheral circuit layer 120 has the concave portion 122 on the surface 121 of the peripheral circuit layer 120, the metal nanowires 136 in the dispersion which have not yet been dried will fill into the concave portion 122. At the same time, if the reactivity of the material of the peripheral circuit layer 120 is higher than the reactivity of the metal nanowires 136, the metal nanowires 136 in the dispersion will slightly move and partially gather in the position being in contact with the surface 121 and the sidewall 125 of the peripheral circuit layer 120 as well as the bottom surface 123 and the sidewall 124 of the concave portion 122, such that the density of the metal nanowires 136 is increased. Then, the curing and drying steps are performed, such that the metal nanowires 136 can be fixed onto the top surface 111 of the substrate 110, the surface 121 and the sidewall 125 of the peripheral circuit layer 120, and the bottom surface 123 and the sidewall 124 of the concave portion 122, so as to form the touch sensing electrode layer 130 of the present disclosure.

Specifically, since in the aforementioned coating step, the metal nanowires 136 in the dispersion is affected by the physical characteristics (e.g., the configuration of the concave portion 122) and chemical characteristics (e.g., the material) of the peripheral circuit layer 120 to move and gather at specific positions. After the curing and drying steps are performed, the metal nanowires 136 can be densely distributed in the touch sensing electrode layer 130 located in the overlap structure 200. Accordingly, the contact impedance between the peripheral circuit layer 120 and the touch sensing electrode layer 130 can be reduced, thereby improving the electrical overlapping stability between the peripheral circuit layer 120 and the touch sensing electrode layer 130.

Figure 3B:
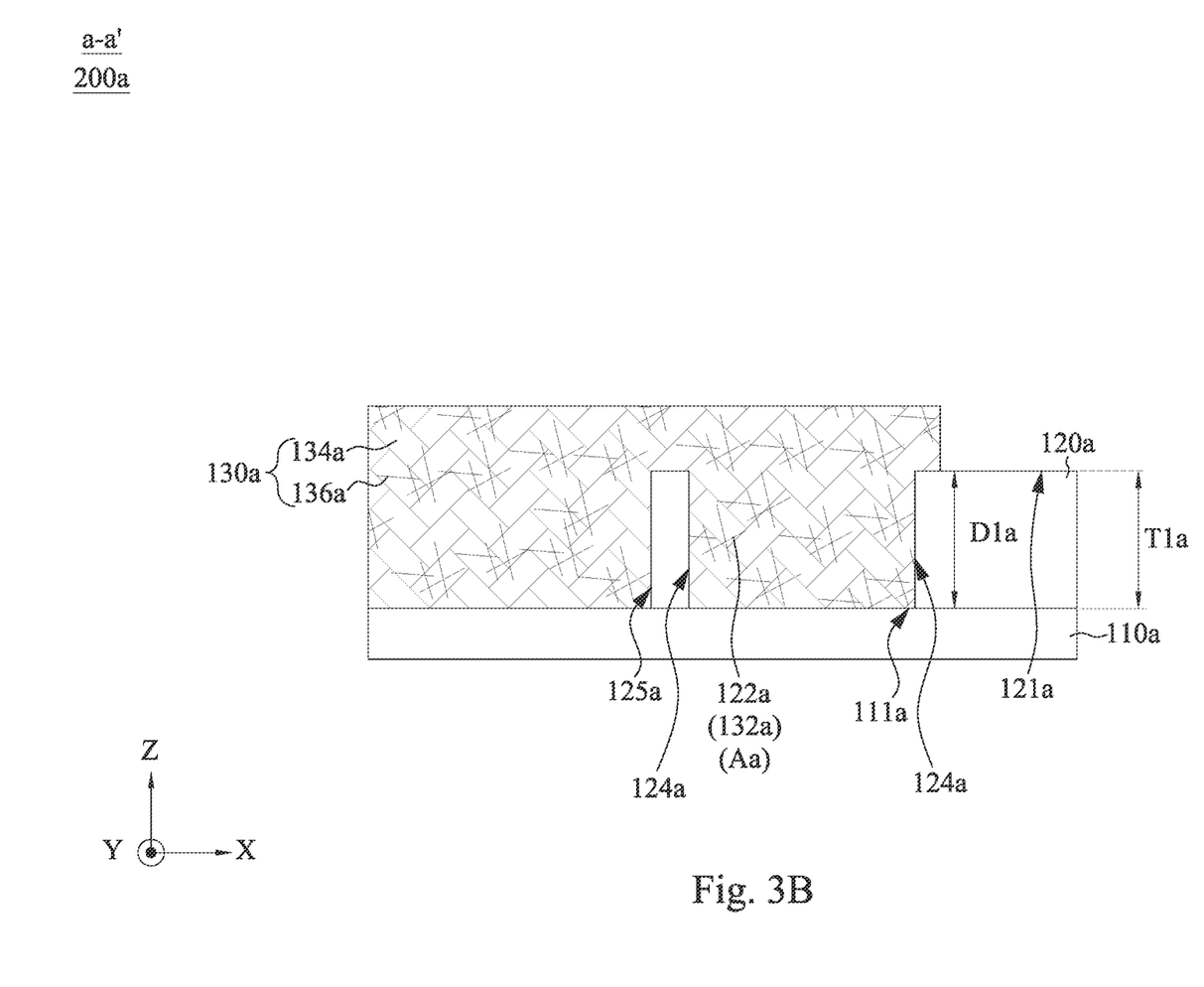
FIG. 3B is a schematic cross-sectional view illustrating the touch panel in FIG. 2 taken along line a-a' according to some other embodiments of the present disclosure.

FIG. 3B is a schematic cross-sectional view illustrating the touch panel 100 in FIG. 2 taken along line a-a' according to some other embodiments of the present disclosure. It should be understood that the cross-section taken along line a-a' in FIG. 3B is the cross-section of the overlapping structure 200a according to some other embodiments of the present disclosure. That is, FIG. 3B is a schematic cross-sectional view illustrating the overlapping structure 200a of the touch panel 100 in FIG. 2 according to some other embodiments of the present disclosure. The elements, connection relationships, materials, characteristics (e.g., density), and efficacies of the overlapping structure 200a in FIG. 3B are substantially identical to those of the overlapping structure 200 in FIG. 3A, which will not be repeated hereinafter. In the following descriptions, only the differences between the overlapping structure 200a and the overlapping structure 200 will be further discussed in detail.

At least one difference between the overlapping structure 200a in FIG. 3B and the overlapping structure 200 in FIG. 3A is that in the overlapping structure 200a, the vertical depth D1a of the concave portion 122a of the peripheral circuit layer 120a is equal to the vertical thickness T1a of the peripheral circuit layer 120a. More specifically, the concave portion 122a is a through hole and includes a sidewall 124a enclosing an accommodating space Aa. The sidewall 124a is adjacently connected to the surface 111a of the substrate 110a facing toward the peripheral circuit layer 120a. In other words, in the overlapping structure 200a of FIG. 3B, the bottom surface of the concave portion 122a of the peripheral circuit layer 120a is formed by the surface 111a of the substrate 110a facing toward the peripheral circuit layer 120a. In some embodiments, the entering portion 132a of the touch sensing electrode layer 130a may further be accommodated in the accommodating space Aa and tightly contact the surface 111a of the substrate 110a. Since the vertical depth D1a of the concave portion 122a of the peripheral circuit layer 120a is equal to the vertical thickness T1a of the peripheral circuit layer 120a, when the concave portion 122a of the peripheral circuit layer 120a is formed by lithography etching, the substrate 110a can simply serve as an etching stop layer without the need for calculating the depth of etching or the time required for etching, thereby improving the convenience in the manufacturing process of the touch panel 100.

The touch panel 100 of the present disclosure can be assembled with other electronic devices, such as a display with touch function. For example, the touch panel 100 can be bonded to a display device (e.g., a liquid crystal display device or an organic light-emitting diode display device), and optical adhesive or other adhesives can be used to bond between the touch panel 100 and the display device. The touch panel 100 of the present disclosure can further be applied to electronic devices such as portable phones, tablets, and notebooks, and can also be applied to flexible products. The touch panel 100 of the present disclosure can also be applied to a polarizer. The touch panel 100 of the present disclosure can be applied to wearable devices (e.g., watches, glasses, smart clothes, and smart shoes) and automotive devices (e.g., dashboards, driving recorders, rearview mirrors, and windows).

According to the aforementioned embodiments of the present disclosure, the touch panel includes a peripheral circuit layer having a concave portion and a touch sensing electrode layer having an entering portion. Since the touch sensing electrode layer extends to cover a portion of the peripheral circuit layer such that the entering portion extends into the concave portion and the shapes of the entering portion and the concave portion are complementary and matched with each other, the overlapping area of the peripheral circuit layer and the touch sensing electrode layer can be increased, thereby improving the electrical overlapping stability between the peripheral circuit layer and the touch sensing electrode layer. In addition, through the combination of materials between the peripheral circuit layer and the touch sensing electrode layer, the electrical overlapping stability between the peripheral circuit layer and the touch sensing electrode layer can also be improved. As a result, a lateral width of the border region of the touch panel can be reduced to meet the needs of users for narrow bezel products.

Although the present disclosure has been described in considerable detail with reference to certain embodiments thereof, other embodiments are possible. Therefore, the spirit and scope of the appended claims should not be limited to the description of the embodiments contained herein.

It will be apparent to those skilled in the art that various modifications and variations can be made to the structure of the present disclosure without departing from the scope or spirit of the disclosure. In view of the foregoing, it is intended that the present disclosure covers modifications and variations of this disclosure provided they fall within the scope of the following claims.

What is claimed is:

1. A touch panel, comprising:
a substrate having a visible region and a border region surrounding the visible region;
a peripheral circuit layer disposed on the substrate and located in the border region, and having at least one concave portion, wherein the concave portion is located on a surface of the peripheral circuit layer facing away from the substrate; and
a touch sensing electrode layer disposed in the visible region and partially extending into the border region to at least cover the concave portion, wherein the touch sensing electrode layer has at least one entering portion filling in the concave portion.

2. The touch panel of claim 1, wherein a vertical depth of the concave portion is smaller than a vertical thickness of the peripheral circuit layer.

3. The touch panel of claim 2, wherein the concave portion comprises a bottom surface and a sidewall adjacently connected to the bottom surface and enclosing an accommodating space.

4. The touch panel of claim 3, wherein the entering portion is accommodated in the accommodating space and contacts the bottom surface and the sidewall.

5. The touch panel of claim 1, wherein a vertical depth of the concave portion is equal to a vertical thickness of the peripheral circuit layer.

6. The touch panel of claim 5, wherein the concave portion comprises a sidewall enclosing an accommodating space, and the sidewall is adjacently connected to a surface of the substrate facing toward the peripheral circuit layer.

7. The touch panel of claim 6, wherein the entering portion is accommodated in the accommodating space and contacts the surface of the substrate facing toward the peripheral circuit layer and the sidewall.

8. The touch panel of claim 1, wherein the touch sensing electrode layer comprises a matrix and a plurality of metal nanostructures distributed in the matrix.

9. The touch panel of claim 8, wherein a density of the metal nanostructures in the matrix is between 10% and 50%.

10. The touch panel of claim 8, wherein the peripheral circuit layer comprises a metal material, and a reactivity of the metal material is higher than a reactivity of the metal nanostructures.

11. The touch panel of claim 1, wherein the touch sensing electrode layer is in contact with a sidewall of the peripheral circuit layer.

12. A touch device comprising the touch panel of claim 1.

13. The touch device of claim 12, wherein the touch device comprises a display, a portable phone, a notebook, a tablet, a wearable device, a car device, or a polarizer.

14. A touch panel, comprising:
a substrate having a visible region and a border region surrounding the visible region;
a peripheral circuit layer disposed on the substrate and located in the border region; and
a touch sensing electrode layer disposed in the visible region and partially extending into the border region, wherein a portion of the touch sensing electrode layer is laterally between a first portion of the peripheral circuit layer located on a first side of the visible region and a second portion of the peripheral circuit layer located on the first side of the visible region.

15. The touch panel of claim 14, wherein a third portion of the peripheral circuit layer connects the first portion of the peripheral circuit layer to the second portion of the peripheral circuit layer, wherein the third portion of the peripheral circuit layer underlies the portion of the touch sensing electrode layer.

16. The touch panel of claim 15, wherein the portion of the touch sensing electrode layer is separated from the substrate by the third portion of the peripheral circuit layer.

17. The touch panel of claim 14, wherein the portion of the touch sensing electrode layer is in contact with a first sidewall of the first portion of the peripheral circuit layer and a sidewall of the second portion of the peripheral circuit layer.

18. The touch panel of claim 17, wherein the portion of the touch sensing electrode layer is in contact with a top surface of the first portion of the peripheral circuit layer.

19. A touch panel, comprising:
   a substrate having a visible region and a border region surrounding the visible region;
   a peripheral circuit layer disposed on the substrate and located in the border region; and
   a touch sensing electrode layer disposed in the visible region and partially extending into the border region, wherein a portion of the touch sensing electrode layer surrounds a first sidewall, a second sidewall, and a top surface of a first portion of the peripheral circuit layer.

20. The touch panel of claim 19, wherein the portion of the touch sensing electrode layer contacts the first sidewall, the second sidewall, and the top surface of the first portion of the peripheral circuit layer.

\* \* \* \* \*